US010961921B2

(12) United States Patent
Tang

(10) Patent No.: US 10,961,921 B2
(45) Date of Patent: Mar. 30, 2021

(54) MODEL-BASED CONTROL SYSTEM AND METHOD FOR A TURBOPROP ENGINE

(71) Applicant: PRATT & WHITNEY CANADA CORP., Longueuil (CA)

(72) Inventor: Poi Loon Tang, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 261 days.

(21) Appl. No.: 16/135,327

(22) Filed: Sep. 19, 2018

(65) Prior Publication Data
US 2020/0088112 A1 Mar. 19, 2020

(51) Int. Cl.
*F02C 9/48* (2006.01)
*B64C 11/30* (2006.01)
*B64D 31/06* (2006.01)

(52) U.S. Cl.
CPC .............. *F02C 9/48* (2013.01); *B64C 11/301* (2013.01); *B64D 31/06* (2013.01); *F05D 2220/323* (2013.01); *F05D 2260/70* (2013.01); *F05D 2260/81* (2013.01); *F05D 2270/20* (2013.01); *F05D 2270/335* (2013.01); *F05D 2270/54* (2013.01); *F05D 2270/71* (2013.01)

(58) Field of Classification Search
CPC ......... F02C 9/48; B64C 11/301; B64D 31/06; F05D 2260/81; F05D 2270/20
USPC .......................................................... 701/100
See application file for complete search history.

(56) References Cited

U.S. PATENT DOCUMENTS

| 3,023,575 A | 3/1962 | Haase et al. |
| 3,516,250 A | 6/1970 | Moore, Jr. |
| 3,882,672 A | 5/1975 | Bauerfeind |
| 4,157,010 A | 6/1979 | Sailer |
| 4,606,191 A | 8/1986 | Collins et al. |
| 4,648,797 A | 3/1987 | Martin |
| 4,807,129 A | 2/1989 | Perks |
| 4,813,226 A | 3/1989 | Grosselfinger et al. |
| 4,825,639 A | 5/1989 | Krukoski |
| 4,958,289 A | 9/1990 | Sum et al. |
| 4,991,389 A | 2/1991 | Schafer |

(Continued)

FOREIGN PATENT DOCUMENTS

| CN | 103593524 | 11/2013 |
| CN | 204701764 | 5/2015 |

(Continued)

*Primary Examiner* — Yazan A Soofi
(74) *Attorney, Agent, or Firm* — Norton Rose Fulbright Canada LLP

(57) ABSTRACT

Systems and methods for controlling a gas turbine engine and a propeller are described herein. A target output power for the engine and a target speed for the propeller are received. A measurements of at least one engine parameter and a measurement of at least one propeller parameter are received. At least one engine control command is generated based on the target output power, the measurement of the at least one engine parameter and at least one model of the engine. At least one propeller control command is generated based on the target speed, the measurement of the at least one propeller parameter and the at least one model of the propeller. The at least one engine control command is output for controlling an operation of the engine accordingly and the at least one propeller control command is output for controlling an operation of the propeller accordingly.

16 Claims, 10 Drawing Sheets

(56) References Cited

U.S. PATENT DOCUMENTS

| | | |
|---|---|---|
| 5,042,245 A | 8/1991 | Zickwolf, Jr. |
| 5,165,845 A | 11/1992 | Khalid |
| 5,189,620 A | 2/1993 | Parsons et al. |
| 6,220,086 B1 | 4/2001 | Andrew et al. |
| 6,364,602 B1 | 4/2002 | Andrew et al. |
| 6,474,935 B1 | 11/2002 | Crotty et al. |
| 6,506,010 B1 | 1/2003 | Yeung et al. |
| 6,539,783 B1 | 4/2003 | Adibhatla |
| 6,729,139 B2 | 5/2004 | Mattice et al. |
| 6,758,044 B2 | 7/2004 | Mannarino |
| 6,789,000 B1 | 9/2004 | Munson, Jr. |
| 6,823,675 B2 | 11/2004 | Brunell et al. |
| 6,879,885 B2 | 4/2005 | Driscoll et al. |
| 6,882,889 B2 | 4/2005 | Fuller et al. |
| 6,935,836 B2 | 8/2005 | Ress, Jr. et al. |
| 6,959,094 B1 | 10/2005 | Cascone et al. |
| 7,216,071 B2 | 5/2007 | Volponi |
| 7,219,040 B2 | 5/2007 | Renou et al. |
| 7,299,621 B2 | 11/2007 | Bart et al. |
| 7,513,120 B2 | 4/2009 | Kupratis |
| 7,603,222 B2 | 10/2009 | Wiseman et al. |
| 7,777,358 B2 | 8/2010 | Halsey et al. |
| 7,822,512 B2 | 10/2010 | Thatcher et al. |
| 7,827,803 B1 | 11/2010 | Wadia et al. |
| 7,837,429 B2 | 11/2010 | Zhang et al. |
| 8,090,456 B2 | 1/2012 | Karpman et al. |
| 8,171,717 B2 | 5/2012 | Mosley et al. |
| 8,185,291 B2 | 5/2012 | Nakakita et al. |
| 8,201,414 B2 | 6/2012 | Haehner et al. |
| 8,215,095 B2 | 7/2012 | Mosley |
| 8,364,340 B2 | 1/2013 | Nestico et al. |
| 8,366,055 B2 | 2/2013 | Ulrich et al. |
| 8,689,539 B2 | 4/2014 | Lu et al. |
| 8,694,182 B2 | 4/2014 | Cherepinsky |
| 8,706,460 B2 | 4/2014 | Falangas |
| 8,855,837 B2 | 10/2014 | Cherepinksy |
| 8,876,037 B2 | 11/2014 | Ashford |
| 9,081,378 B2 | 7/2015 | Lu et al. |
| 9,342,060 B2 | 5/2016 | Fuller et al. |
| 9,354,621 B2 | 5/2016 | Westervelt et al. |
| 9,429,952 B2 | 8/2016 | Geiger et al. |
| 9,440,746 B2 | 9/2016 | Swann |
| 9,477,795 B1 | 10/2016 | Witzberger et al. |
| 9,540,944 B2 | 1/2017 | Meisner et al. |
| 9,558,318 B2 | 1/2017 | Hoeng et al. |
| 9,759,132 B2 | 9/2017 | Khalid |
| 9,845,145 B2 | 12/2017 | Lu et al. |
| 9,885,297 B2 | 2/2018 | Wang et al. |
| 9,932,120 B2 | 4/2018 | Fisher et al. |
| 10,002,471 B2 | 6/2018 | Blayvas et al. |
| 10,017,263 B2 | 7/2018 | Litwinowicz et al. |
| 10,113,487 B2 | 10/2018 | Cai et al. |
| 10,119,460 B2 | 11/2018 | Primus et al. |
| 2004/0107013 A1 | 6/2004 | Fuller et al. |
| 2005/0193739 A1 | 9/2005 | Brunell et al. |
| 2006/0101826 A1 | 5/2006 | Martis et al. |
| 2006/0282177 A1 | 12/2006 | Fuller et al. |
| 2007/0264617 A1 | 11/2007 | Richardson et al. |
| 2008/0243352 A1 | 10/2008 | Healy |
| 2010/0021285 A1 | 1/2010 | Rowe et al. |
| 2010/0026948 A1 | 2/2010 | Wang et al. |
| 2011/0146232 A1 | 6/2011 | Westervelt et al. |
| 2012/0221156 A1 | 8/2012 | Fuller et al. |
| 2013/0013951 A1 | 1/2013 | Gotz et al. |
| 2013/0202434 A1 | 8/2013 | Lu et al. |
| 2013/0236296 A1 | 9/2013 | Collopy et al. |
| 2014/0090392 A1 | 4/2014 | Meisner et al. |
| 2014/0090456 A1 | 4/2014 | Meisner et al. |
| 2015/0113996 A1 | 4/2015 | Cai et al. |
| 2016/0069277 A1 | 3/2016 | Meisner et al. |
| 2016/0236790 A1* | 8/2016 | Knapp ................ G08G 5/0021 |
| 2017/0081038 A1 | 3/2017 | Looper et al. |
| 2017/0107914 A1* | 4/2017 | Lu ............................ F02K 3/06 |
| 2017/0145925 A1* | 5/2017 | Kusumi ................. H02J 3/386 |
| 2017/0234233 A1* | 8/2017 | Schwarz ................ F02C 7/268 |
| | | 60/204 |
| 2018/0010515 A1 | 1/2018 | Kolhouse et al. |
| 2018/0030904 A1* | 2/2018 | Meunier ................... F02C 9/28 |
| 2018/0112603 A1* | 4/2018 | Morgan ................... F02C 3/04 |
| 2019/0031359 A1* | 1/2019 | Djelassi ............... G05B 13/042 |

FOREIGN PATENT DOCUMENTS

| | | |
|---|---|---|
| CN | 108304886 | 2/2018 |
| EP | 3045982 | 7/2016 |
| WO | 2014/083259 | 6/2014 |
| WO | 2015/053930 | 4/2015 |
| WO | 2018/103184 | 1/2017 |

* cited by examiner

MODEL-BASED CONTROL SYSTEM AND METHOD FOR A TURBOPROP ENGINE

TECHNICAL FIELD

The present disclosure relates generally to engine control, and, more particularly, to a control system for an engine having a propeller coupled thereto.

BACKGROUND OF THE ART

For turboprop engines, there are two principal and distinct components: a gas turbine engine and a propeller. An engine control system is used to modulate the power output of the engine, for example by controlling fuel flow to the engine. Similarly, a propeller control system is used to modulate the thrust produced by the propeller, for example by changing a propeller rotational speed and/or a propeller blade pitch. In traditional propeller driven aircraft, each of the engine control system and the propeller control system is operated by a pilot using a respective lever for each of the engine and propeller components. For instance, a throttle lever is used to set a desired engine power output, and a condition lever is used to set a desired propeller rotational speed and blade pitch angle. However, separate control systems may not be desirable in certain circumstances.

There is therefore a need for an improved control system for a turboprop engine.

SUMMARY

In one aspect, there is provided a control system for an engine and a propeller coupled to the engine. The control system comprises: at least one processing unit; and a non-transitory computer-readable memory having stored thereon program instructions executable by the at least one processing unit for: receiving a target output power for the engine and a target speed for the propeller; receiving, from at least one sensing device, a measurement of at least one engine parameter and a measurement of at least one propeller parameter; generating at least one engine control command based on the target output power, the measurement of the at least one engine parameter, and at least one model of the engine, the at least one engine control command comprising instructions for adjusting the at least one engine parameter to bring an output power of the engine toward the target output power; generating at least one propeller control command based on the target speed, the measurement of the at least one propeller parameter, and at least one model of the propeller, the at least one propeller control command comprising instructions for adjusting the at least one propeller parameter to bring a rotational speed of the propeller toward the target speed; outputting the at least one engine control command for controlling an operation of the engine accordingly; and outputting the at least one propeller control command for controlling an operation of the propeller accordingly.

In one aspect, there is provided a method for controlling an engine and a propeller coupled to the engine. The method comprises: receiving a target output power for the engine and a target speed for the propeller; receiving, from at least one sensing device, a measurement of at least one engine parameter and a measurement of at least one propeller parameter; generating at least one engine control command based on the target output power, the measurement of the at least one engine parameter, and at least one model of the engine, the at least one engine control command comprising instructions for adjusting the at least one engine parameter to bring an output power of the engine toward the target output power; generating at least one propeller control command based on the target speed, the measurement of the at least one propeller parameter, and at least one model of the propeller, the at least one propeller control command comprising instructions for adjusting the at least one propeller parameter to bring a rotational speed of the propeller toward the target speed; outputting the at least one engine control command for controlling an operation of the engine accordingly; and outputting the at least one propeller control command for controlling an operation of the propeller accordingly.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
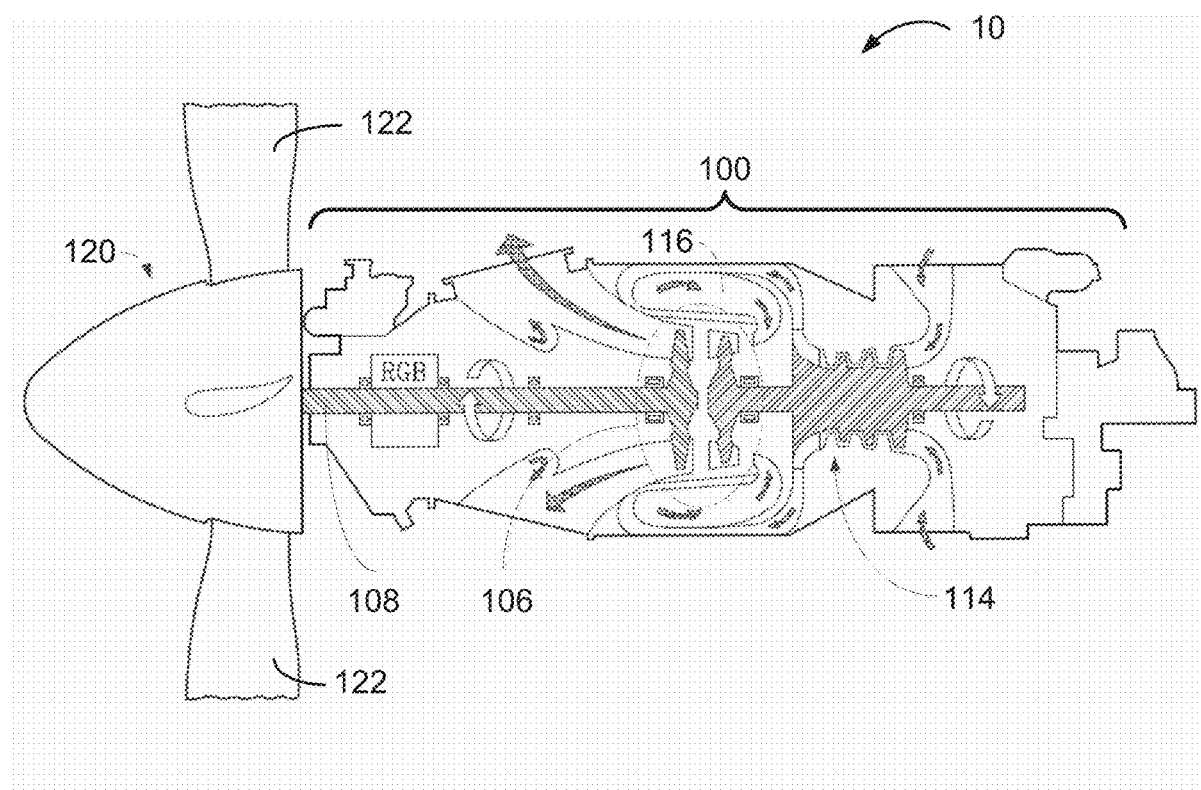
FIG. 1 is a schematic cross-sectional view of an example gas turbine engine.

FIG. 1 illustrates a turbopropeller powerplant 10 for an aircraft of a type preferably provided for use in subsonic flight, generally comprising a gas turbine engine 100 and a propeller 120. The turbopropeller powerplant 10 can be controlled using the systems and methods described herein. The turbopropeller powerplant 10 generally comprises in serial flow communication the propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases. The propeller 120 converts rotary motion from a shaft of the engine 110 to provide propulsive force for the aircraft, also known as thrust. The propeller 120 comprises one or more propeller blades 122. A blade angle of the propeller blades 122 may be adjusted. The blade angle may be referred to as a beta angle, an angle of attack or a blade pitch. The turbopropeller powerplant 10 may be implemented to comprise a single or multi-spool gas turbine engine with a free turbine or boosted architecture, where the turbine section 106 is connected to the propeller 120 through a gearbox RGB.

Figure 2:
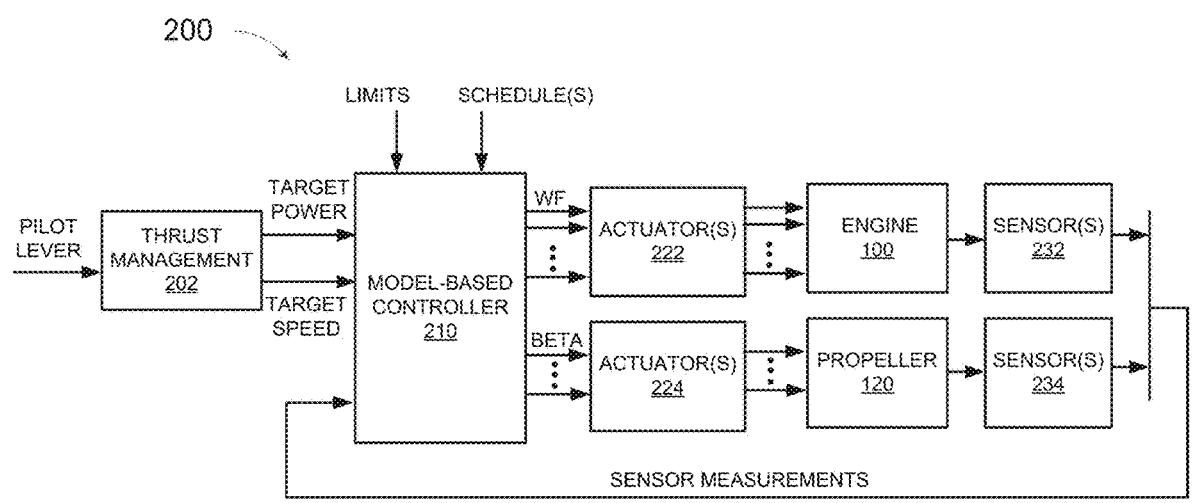
FIG. 2 is a block diagram of a system for controlling an engine and a propeller in accordance with an embodiment.

With reference to FIG. 2, there is shown a control system 200 for controlling an engine and a propeller coupled to the engine. While the system 200 is described herein with reference to the engine 100 and the propeller 120, this is for example purposes. The system 200 may be applied to any other suitable engine and/or other suitable propeller with at least one blade having a variable blade angle. The control system 200 comprises a model-based controller 210. The model-based controller 210 comprises at least one model of the engine 100 and the propeller 120. The model-based controller 210 simultaneously controls the engine 100 and the propeller 120 according to a target output power (or torque) of the engine 100 and a target speed of the propeller 120. The model-based controller 210 controls the engine 100 and the propeller 120 by providing control commands that adjust at least one parameter of the engine 100 in order to adjust the output power of the engine 100 and at least one parameter of the propeller 120 in order to adjust the rotational speed of the propeller 120. In other words, the at least one engine parameter is adjustable to control the output power of the engine 100 and the at least one propeller parameter is adjustable to control the rotational speed of the propeller 120.

In accordance with an embodiment, a thrust management system 202 provides the target output power (or torque) and the target speed to the model-based controller 210. The thrust management system 202 may determine the target output power (or torque) and the target speed from input provided from at least one pilot lever. The at least one pilot lever may comprise a thrust lever used to set a desired engine thrust, a power lever used to set a desired engine power output, and/or a condition lever used to set a desired propeller rotational speed and/or blade pitch angle. Accordingly, the target output power is indicative of a target output power for the engine 100, the target torque is indicative of a target output torque for the engine 100, and the target speed is indicative of a target rotational speed for the propeller 120. The thrust management system 202 may be implemented based on the thrust management system described in U.S. Patent Application Publication No. 2018/0112603 to Morgan et al., the content of which is hereby incorporated by reference. In some embodiments, the target torque is determined from the target output power. In some embodiments, the target output power (or torque) and/or the target speed may be provided to the model-based controller 210 directly from the at least one pilot lever. Accordingly, the model-based controller 210 may implement the functionality of the thrust management system 202.

In accordance with an embodiment, the model-based controller 210 provides at least one control command to at least one actuator 222 associated with the engine 100. Each one of the actuators 222 may be associated with the control of a given engine parameter. While the actuators 222 are illustrated as separate from the engine 100 (for clarity purposes), the engine 100 may comprise the actuators 222. The actuator(s) 222 physically adjust components of the engine 100 to control operation of the engine 100 based on the control command(s). For example, the control commands (referred to herein as the "engine control commands") output by the model-based controller 210 to the actuators 222 may comprise one or more control commands to adjust each of one or more engine parameters to control an operating condition of the engine 100. The engine control commands may comprise one or more commands for adjusting: a fuel flow (WF) to the engine 100, a position of at least one inlet guide vane (IGV), a position of at least one core variable guide vane (VGV), engine bleed, a position of at least one blow off valve (BOV) or may comprise any other suitable engine control command for adjusting an engine parameter to control an operating condition of the engine 100, The engine parameters may comprise one or more of: shaft power, shaft torque, shaft speed, compressor pressure, turbine temperature, a fuel flow to the engine 100, a position of at least one inlet guide vane, a position of at least one core variable guide vane, engine bleed, a position of at least one blow off valve, or any other suitable engine parameter corresponding to an operation condition of the engine 100.

Similarly, in accordance with an embodiment, the model-based controller 210 provides at least one control command to at least one actuator 224 associated with the propeller 120. Each one of the actuators 224 may be associated with the control of a given propeller parameter. While the actuators 224 are illustrated as separate from the propeller 120, the propeller 120 may comprise the actuators 224 which physically adjust components of the propeller 120 to control the operation of the propeller 120. For example, the control commands (referred to as "propeller control commands") output by the model-based controller 210 to the actuators 224 may comprise one or more control commands for controlling one or more propeller parameters. The propeller parameters may comprise one or more of: the blade angle of the propeller 120, a position of a beta ring of the propeller 120, the rotational speed of the propeller 120 and/or any other suitable propeller parameter. For example, during flight, the propeller parameter may be the propeller rotational speed, which is commanded to achieve the target speed by generating propeller control commands to adjust the blade angle to a coarser or finer pitch. By way of another example, during ground taxiing and/or reverse thrust on landing, the propeller control commands may be a position of an actuator for adjusting the blade angle or beta ring.

In accordance with an embodiment, the engine 100 has one or more sensors 232 for measuring the engine parameter(s) and the propeller 120 has one or more sensors 234 for measuring the propeller parameter(s). The measurements of the engine parameter(s) and/or propeller parameter(s) may be obtained continuously (e.g. in real time) and/or may be recorded regularly in accordance with any suitable time interval or irregularly. The sensor measurements are fed back to the model-based controller 210. In some embodiments, one or more of the engine or propeller parameters may be provided to an engine and/or aircraft computer. One or more of the engine or propeller parameters may be derived from the sensor measurements. In some embodiments, one or more of the engine or propeller parameters may be provided by an engine and/or aircraft computer. For example, an ambient temperature measurement may be provided by an aircraft computer, which may be used by the controller 210 for corrections.

Given ones of the sensors 232, 234 and/or actuators 222, 224 may be part of a unit or system that controls and/or measures a given engine or propeller parameter. For example, a fuel metering unit may control and measure the fuel flow, an inlet guide vane system may control and measure the position of the inlet guide vanes, a core guide vane system may control and measure the position of the core variable guide vanes, a bleed valve system may control and measure the position of the bleed valves, a blow off valve system may control and measure the position of the blow off valves and/or a beta angle system may control and measure the beta angle of the propeller 120.

The model-based controller 210 may receive limits for the engine 100 and the propeller 120 and/or one or more schedules. Alternatively, the model-based controller 210 may already be provided with the limits and/or one or more schedules. The limits may comprise one or more of a core spool acceleration limit (Ngdot), a core spool deceleration limit, an engine rotational speed limit, a fuel flow rate of change limit, a ratio unit limit of fuel flow to combustor inlet pressure, an overspeed limit and/or any other suitable limit. The limits may be categorized as one or more of: engine transient limits, propeller transient limits, engine operating limits, propeller operating limits and actuator limits. The transient limits correspond to limits that need to be maintained when the engine 100 accelerates or decelerates between operating conditions. Transient limits may be imposed to prevent compressor surging or stalling or turbine overheating on acceleration, or combustor flaming out on deceleration. For example, the core spool acceleration limit can be imposed to prevent the compressor from surging on acceleration. By way of another example, the core spool deceleration limit can be imposed to prevent the combustor from flaming out. The fuel flow rate of change limits and the ratio unit are examples of transient limits. Operating limits may be maximum or minimum limits. Maximum operating limits may be imposed to maintain the structural integrity or the life of engine components. For example, overspeed limits can be used to prevent shaft, gearbox or propeller breakage; turbine blade off or pressure limits can be used to maintain combustor life; and temperature limits can be used to prevent burning out of the turbine blade. Minimum operating limits may be imposed to prevent combustor flame out and to also maintain the structural integrity. For example, to prevent combustor flameout, minimum core speed or combustor pressure limits may be used. By way of another example, to maintain structural integrity, minimum shaft speed limits may be used to prevent exciting certain vibration modes of the shaft or compressor turbine blades. Actuator limits are imposed to prevent commanding a higher rate than the actuator's capability or beyond the actuator's range of motion. The schedules may include one or more of IGV, VGV, BOV schedules and/or any other suitable schedule. The aforementioned limits may also be scheduled as a function of one or more given engine parameters. For example, core spool acceleration may be scheduled as a function of corrected core spool speed. The model-based controller 210 controls the engine 100 and the propeller 120, within the engine and propeller operating limits, by controlling the at least one engine parameter and the at least one propeller parameter with the determined control commands. In accordance with an embodiment, the engine and propeller control commands are determined by the model-based controller 210 from the target output power (or torque), the target speed, the sensor measurements, the one or more schedules and the operating limits.

It should be appreciated that, in accordance with an embodiment, the model-based controller 210 is implemented without the use of an inner and outer control loop configuration and without separate control systems for the engine and the propeller.

Figure 3A:
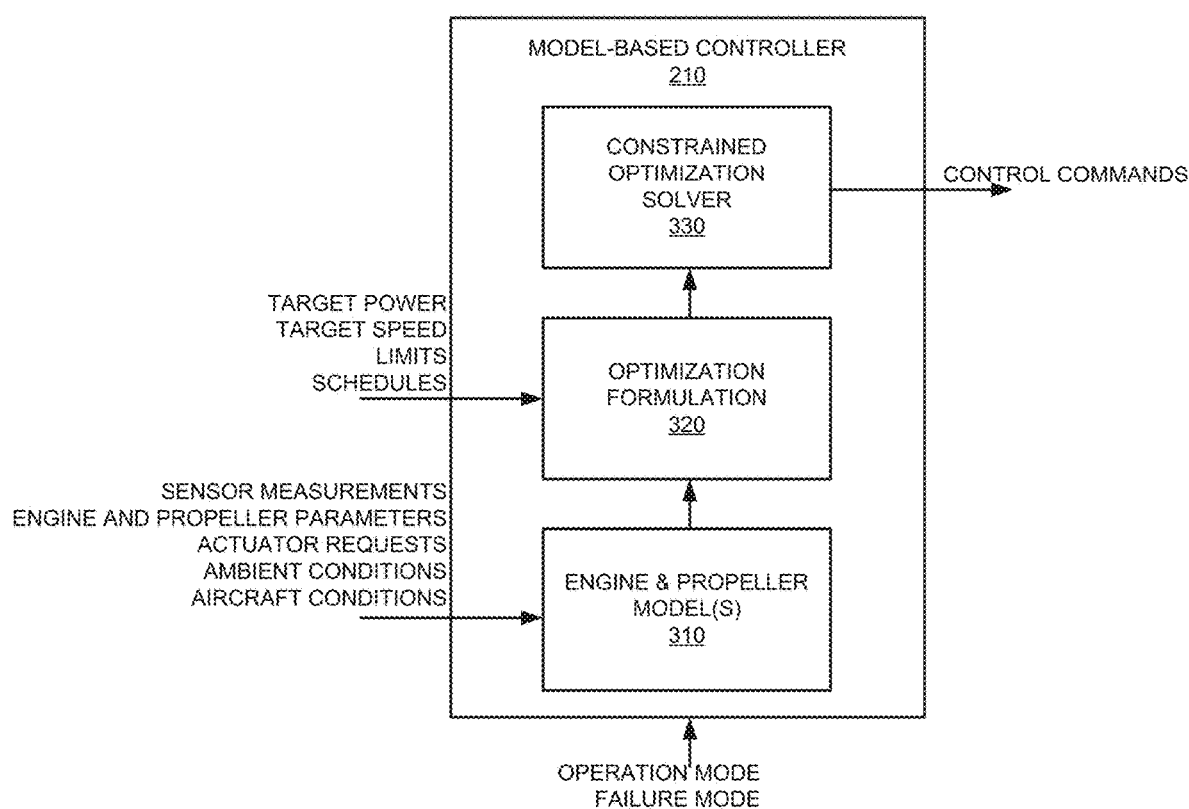
FIG. 3A is a block diagram of an example model-based controller of the system of FIG. 2 in accordance with an embodiment.

Referring to FIG. 3A, an example of the model-based controller 210 is shown. In accordance with an embodiment, the model-based controller 210 comprises an engine and propeller model(s) module 310, an optimization formulation module 320 and a constrained optimization solver module 330.

The engine and propeller model(s) module 310 models the engine 100 and the propeller 120. The engine and propeller model(s) module 310 may model the engine 100 and the propeller 120 using a single integrated model of the engine 100 and the propeller 120. The engine and propeller model(s) module 310 may model the engine 100 and the propeller 120 using separate models of the engine 100 and the propeller 120. The engine 100 and/or propeller 120 may be modeled using multiple sub-models corresponding to various aspects of the engine 100 and/or propeller 120. The at least one model of the engine 100 and the propeller 120 corresponds to an internal representation of the engine 100 and the propeller 120. The at least one model may represent the dynamics of the engine 100 and the propeller 120, for example, to account for cross-coupling effects or interactions from the actuators 222, 224 on governing targets and limits. The model(s) may be linear or nonlinear. Linear model(s) may be in the form of piecewise transfer functions or state-space schedules. The transfer functions or state-space schedules may be as a function of ambient conditions (e.g., altitude, MACH correction, and/or any other suitable ambient condition), aircraft conditions (e.g., speed and/or any other suitable aircraft conditions), and/or engine parameters (e.g., power turbine speed, torque and/or any other suitable parameter). Non-linear model(s) may comprise differential equations. The at least one model is determined based on the inputs that the engine and propeller model(s) module 310 receives. In other words, based on the input that the engine and propeller model(s) module 310 receives, the engine and propeller model(s) module 310 models the engine 100 and the propeller 120. The engine and propeller model(s) module 310 may receive sensor measurements, measured and/or calculated engine and/or propeller parameters, actuator positions, ambient conditions, aircraft conditions, any other suitable operating condition of the engine 100 and/or the propeller, and/or any other suitable input. For example, the engine and propeller model(s) module 310 may determine at least one model of the engine 100 and the propeller 120 based at least on the sensor measurements. By way of another example, the engine and propeller model(s) module 310 may determine at least one model of the engine 100 and the propeller 120 based at least on the sensor measurements and one or more of the following: calculated engine and/or propeller parameters, previous control commands, ambient conditions and aircraft conditions. The engine and propeller model(s) module 310 provides the model(s) to the optimization formulation module 320 by outputting data indicative of the model(s). This outputted data may comprise engine parameters and/or propeller parameters of the modelled engine and/or the propeller. For example, the output data may comprise one or more of speeds, torque, thrust, pressures, temperatures, airflows, ratios of pressure or temperature of the modelled engine and/or the propeller.

The optimization formulation module 320 receives the model(s) of the engine 100 and the propeller 120. The optimization formulation module 320 may receive the model(s) as the outputted data from the engine and propeller model(s) module 310. The optimization formulation module 320 may further receive the power (or torque) target, the target speed, the operating limits of the engine 100 and/or the propeller 120, the schedules, and/or any other suitable input. Based on the input, the optimization formulation module 320 determines at least one optimization problem which an optimization solver may be able to solve, for example, using a numerical iterative process in real-time. The optimization formulation module 320 may determine an optimization problem based at least on the model(s) of the engine 100 and the propeller 120, the target output power (or torque), and the target speed. By way of another example, the optimization formulation module 320 may determine an optimization problem based at least on the model(s) of the engine 100 and the propeller 120, the target output power (or torque), the target speed and one or more of: the engine operating limits, the propeller operating limits, the IGV schedule(s), the VGV schedule(s), the BOV schedule(s). The optimization formulation module 320 provides the at least one optimization problem to the constrained optimization solver module 330.

The constrained optimization solver module 330 receives the at least one optimization problem. The constrained optimization solver module 330 solves the at least one optimization problem to find optimal engine and propeller control commands to achieve the target output power (or torque) and the target speed. The constrained optimization solver module 330 may solve the at least one optimization problem to find the engine and propeller control commands using a numerical iterative process in real-time. The constrained optimization solver module 330 solves the at least one optimization problem while respecting engine and propeller limits. The constrained optimization solver module 330 outputs the engine and propeller control commands that are provided to the actuator(s) 222, 224.

It should be appreciated that the model-based controller 210 may implement a multivariable control of the engine 100 and the propeller 120. The multivariable control may allow for fast control of the output power of the engine 10 to the target output power and the rotational speed of the propeller 120 to the target speed.

Figure 3B:
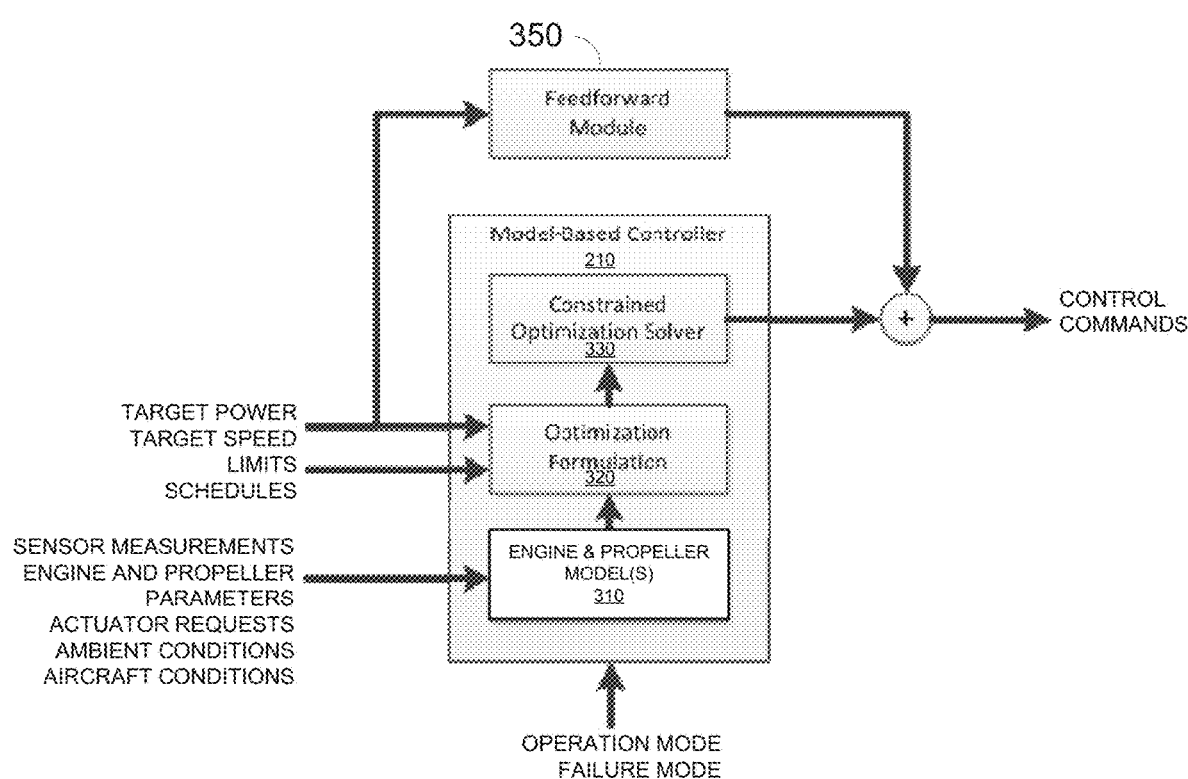
FIG. 3B is a block diagram of the model-based controller of FIG. 3A illustrating a first embodiment of a feedforward path.
Figure 3C:
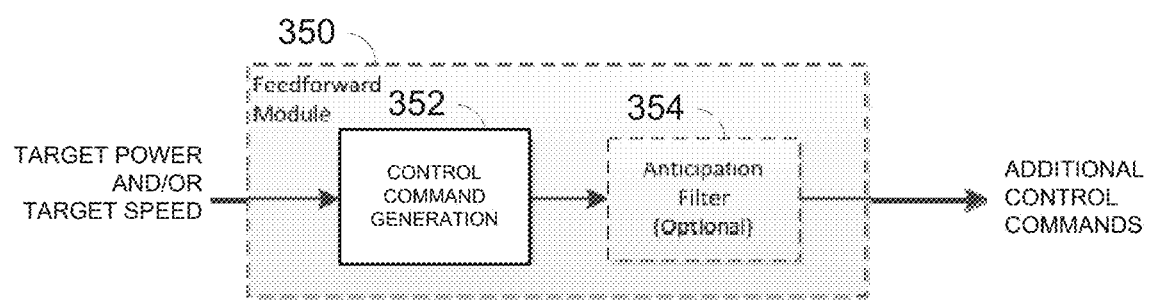
FIG. 3C is a block diagram of the feedforward module of FIG. 3B in accordance with an embodiment.
Figure 3D:
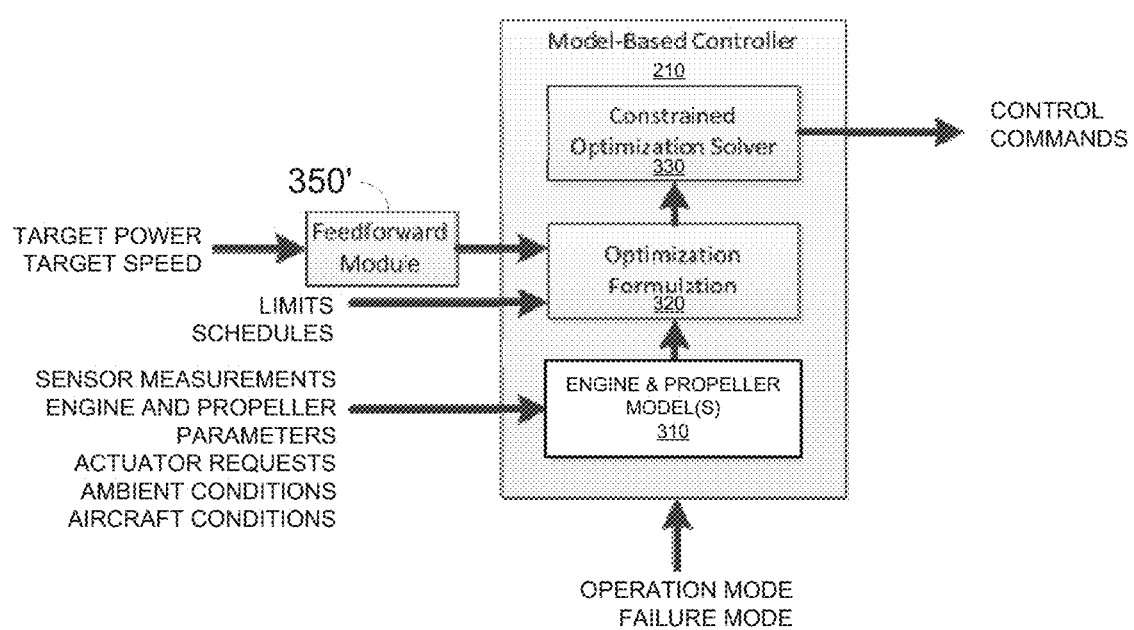
FIG. 3D is a block diagram of the model-based controller of FIG. 3A illustrating a second embodiment of a feedforward path.

In some embodiments, a feedforward path can be added to the target output power and/or the target speed. The feedforward path may allow for faster transitions to the optimal control commands to limit looping of the numerical iterative process, thereby providing faster time to control the engine 100 and the propeller 120 within the engine, propeller and actuator operating limits. Referring to FIG. 3B, a first example embodiment of a feedforward path is illustrated. The target speed and target output power provided to the optimization formulation module 320 are also provided to a feedforward module 350. The feedforward module 350 may generate additional engine and/or propeller control commands which are added to the engine and/or propeller control commands generated by the constrained optimization solver module 330, thereby generating modified engine and/or propeller control commands. The modified engine and/or propeller control commands are accordingly provided to the actuators 222, 224. With additional reference to FIG. 3C, an embodiment of the feedforward module 350 is illustrated. In some embodiments, the feedforward module 350 comprises a control command generation module 352 that generates control commands from the target output power and/or the target speed. The control command generation module 352 may comprise a lookup table for determining control commands from the target output power and/or the target speed. The control command generation module 352 may comprise one or more models represented as one or more transfer functions. For example, a transfer function may associates the target output power to a fuel flow command. The feedforward module 350 may optionally comprise an anticipation filter 354 such as a derivative filter to filter the engine and/or propeller control commands generated by the control command generation module 352. Referring to FIG. 3D, a second example embodiment of a feedforward path is illustrated. In this example, the target speed and target output power are inputted into the feedforward module 350' which reshapes the profile of the target speed and target output power that is inputted into the optimization formulation module 320. The feedforward module 350' may be implemented in a similar manner as the feedforward module 350 (e.g., using lookup tables, models, transfer functions, and/or filters).

In some embodiments, an error based amplification may be included in the model-based controller 210. For example, an error value, such as target output power minus power feedback, can be amplified. When the error value is higher than zero, the error value can be amplified to be larger than its current value to make the controller 210 react faster or track closer to a changing target output power or target speed. When the error value is lower than zero, the error may be lowered or even zeroed to make the controller 210 less reactive, for example, for the purposes of reducing jitter in the control commands when governing close at target.

In some embodiments, the model(s) of the engine 100 and/or propeller 120 may be adapted in real-time to account for production variability or deterioration. For instance, the model(s) may be designed to represent a new engine or propeller condition. When the engine 100 and/or propeller 120 deteriorate, the model(s) may not capture the change in dynamics (e.g., core spool speed may proportionally change with a change in fuel flow as the engine deteriorates). This may lead to a decrease in closed-loop control response quality when controlling the engine 100 and/or propeller 120 (e.g., higher overshoots, decreased tracking ability to target speed or power). In order to maintain closed-loop control response quality throughout the operating life of the engine 100 and propeller 120, the model(s) can be adapted to represent the current state of the engine 100 and/or propeller 120. For example, the internal states of the model(s) may be adjusted using a Kalman filtering technique by comparing the available sensor measurements with corresponding model(s) outputs. Correction terms into the model(s) may be generated with the objective to minimize the error between the measured and model outputs.

In some embodiments, in the event of failure of one or more of the sensors 232, 234, or momentary loss of a measurement signal is detected (e.g., loss of the torque signal), the model-based controller 210 and/or the engine and propeller model(s) module 310 may operate using the at least one model without one or more sensor measurements. Accordingly, the model-based controller 210 may receive an operation mode indicating the inputs that the model-based controller 210 is to operate on and/or a failure mode indicating the model-based controller 210 is to operate without one or more sensor measurements.

Figure 4:
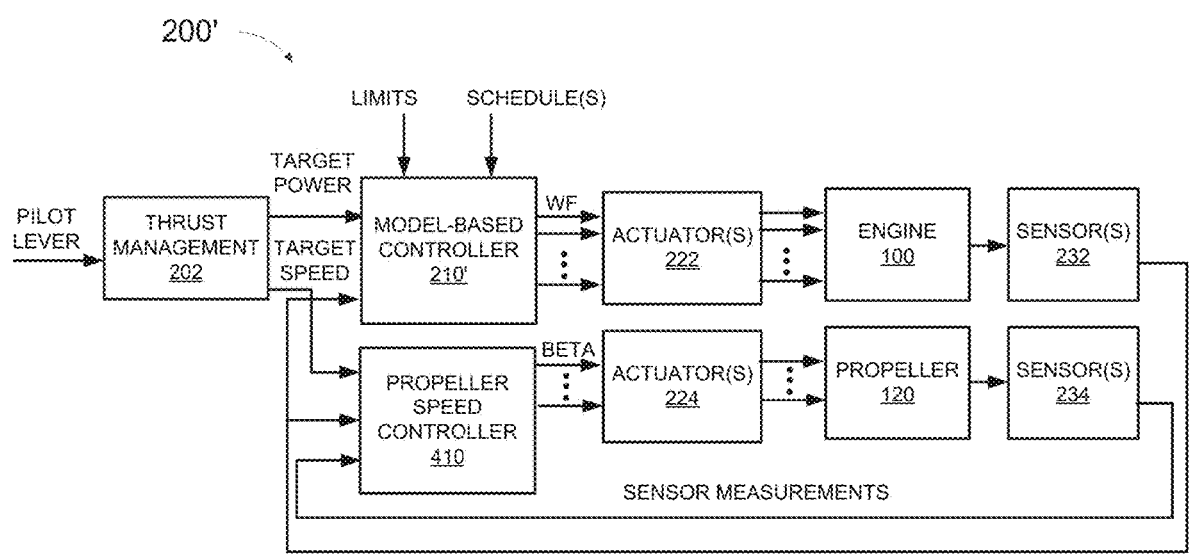
FIG. 4 is a block diagram of a variant of the system of FIG. 2 with separate engine and propeller controllers in accordance with an embodiment.

Referring to FIG. 4, a variant of the system 200 of FIG. 2 is shown. The system 200' substitutes the model-based controller 210 of FIG. 2 with a model-based controller 210' and a propeller speed controller 410. The model-based controller 210' may function similarly to the model-based controller 210. For example, the model-based controller 210' may comprise at least one model of the engine 100 without any model of the propeller 120. In some embodiments, the model-based controller 210' comprises the engine and propeller model(s) module 310, the optimization formulation module 320 and the constrained optimization solver module 330, where the engine and propeller model(s) module 310 comprises at least one model of the engine 100 without any model of the propeller 120. The model-based controller 210' determines and outputs the engine control commands similarly to the model-based controller 210. The propeller speed controller 410 implements the propeller speed control external to the model-based controller 210'. The propeller speed controller 410 may be a model-based controller that functions similarly to the model-based controller 210. For example, the propeller speed controller 410 may comprise at least one model of the propeller 120 without any model of the engine 100. In some embodiments, the propeller speed controller 410 comprises the engine and propeller model(s) module 310, the optimization formulation module 320 and the constrained optimization solver module 330, where the engine and propeller model(s) module 310 comprises at least one model of the propeller 120 without any model of the engine 100. The propeller speed controller 410 may determine the propeller control commands based on the propeller model and one or more of a propeller load map, propeller inertia, a load estimator to estimate propeller accelerations and a dynamic inversion algorithm. The propeller speed controller 410 may be a proportional controller, a proportional with null bias controller, proportional with integral controller or any other suitable controller. The model-based controller 210' outputs the engine control commands to the actuator(s) 222 and the propeller speed controller 410 outputs the propeller control commands to the actuator(s) 224. The sensor measurements from the sensor(s) 232 associated with the engine 100 are fed back to the model-based controller 210' and the propeller speed controller 410. In the illustrated embodiment, the sensor measurements from the sensor(s) 234 associated with the propeller 120 are fed back to the propeller speed controller 410. In some embodiments, the sensor measurements from the sensor(s) 234 associated with the propeller 120 may be fed back to the model-based controller 210'.

Figure 5:
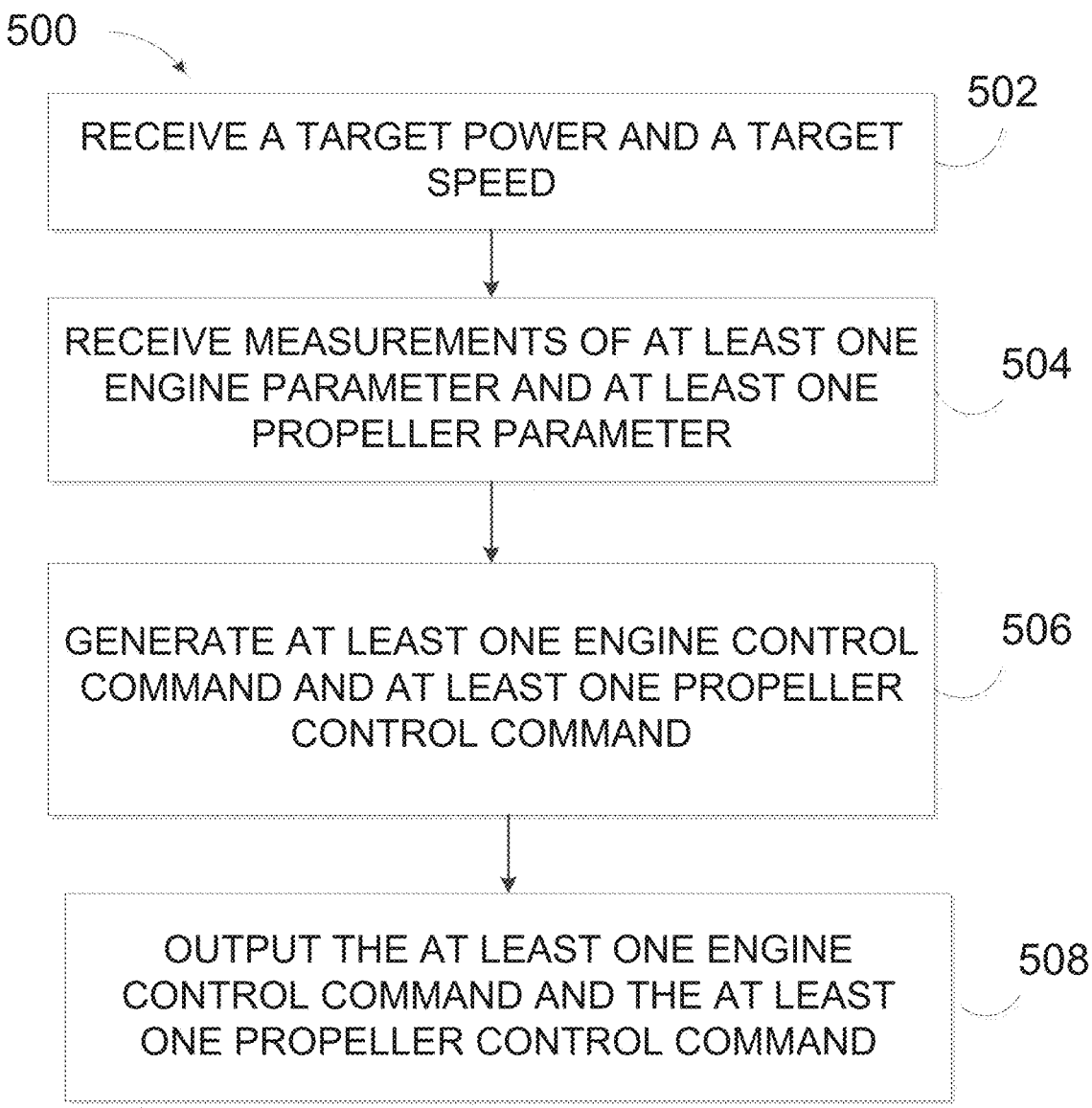
FIG. 5 is a flowchart illustrating an example method for controlling an engine and a propeller in accordance with an embodiment.

With reference to FIG. 5, there is shown a flowchart illustrating an example method 500 for controlling an engine and propeller coupled to the engine, such as at the engine 100 and the propeller 120. While the method 500 is described herein with reference to the engine 100 and the propeller 120, this is for example purposes. The method 200 may be applied to any other suitable engine and/or other suitable types of propeller with a blade having a variable blade angle.

At step 502, the target output power for the engine 100 and the target speed for the propeller 120 are received. The target output power and/or the target speed may be received from the thrust management system 202 or from the at least one pilot lever. In some embodiments, a target torque is determined from the target output power. Alternatively, a target torque may be received from the thrust management system 202 or from the at least one pilot lever.

At step 504, a measurement of at least one engine parameter and a measurement of at least one propeller parameter are received. The measurements may be received from at least one sensing device, for example, the sensors 232, 234. The at least one engine parameter and the at least one propeller parameter may be obtained in any other suitable manner.

At step 506, at least one engine control command and at least one propeller control command are generated. The at least one engine control command is generated based at least on the target output power, the measurement of the at least one engine parameter and the engine model(s). The at least one propeller control command is generated based at least on the target speed, the measurement of the at least one propeller parameter and the propeller model(s). In accordance with an embodiment, the at least one engine control command comprises instructions for adjusting the at least one engine parameter to bring the output power of the engine 100 toward the target output power. In accordance with an embodiment, the at least one propeller control command comprises instructions for adjusting the at least one propeller parameter to bring the rotational speed of the propeller towards the target speed. In some embodiments, the at least one engine control command and the at least one propeller control command are determined with the model-based controller 210. Alternatively, in some embodiments, the at least one engine control command is determined with the model-based controller 210' and the at least one propeller control command is determined with the propeller speed controller 410.

At step 508, the at least one engine control command is output for controlling an operation of the engine accordingly and the at least one propeller control command is output for controlling an operation of the propeller 120 accordingly. In accordance with an embodiment, the at least one engine control command is output to the actuator(s) 222 of the engine 100 and the at least one propeller control command is output to the actuator(s) 224 of the propeller 120. The actuator(s) 222 of the engine 100 may adjust the at least one engine parameter to control the output power of the engine substantially at the target output power. The actuator(s) 224 of the propeller 120 may adjust the at least one propeller parameter to control the rotational speed of the propeller substantially at the target speed.

Figure 6:
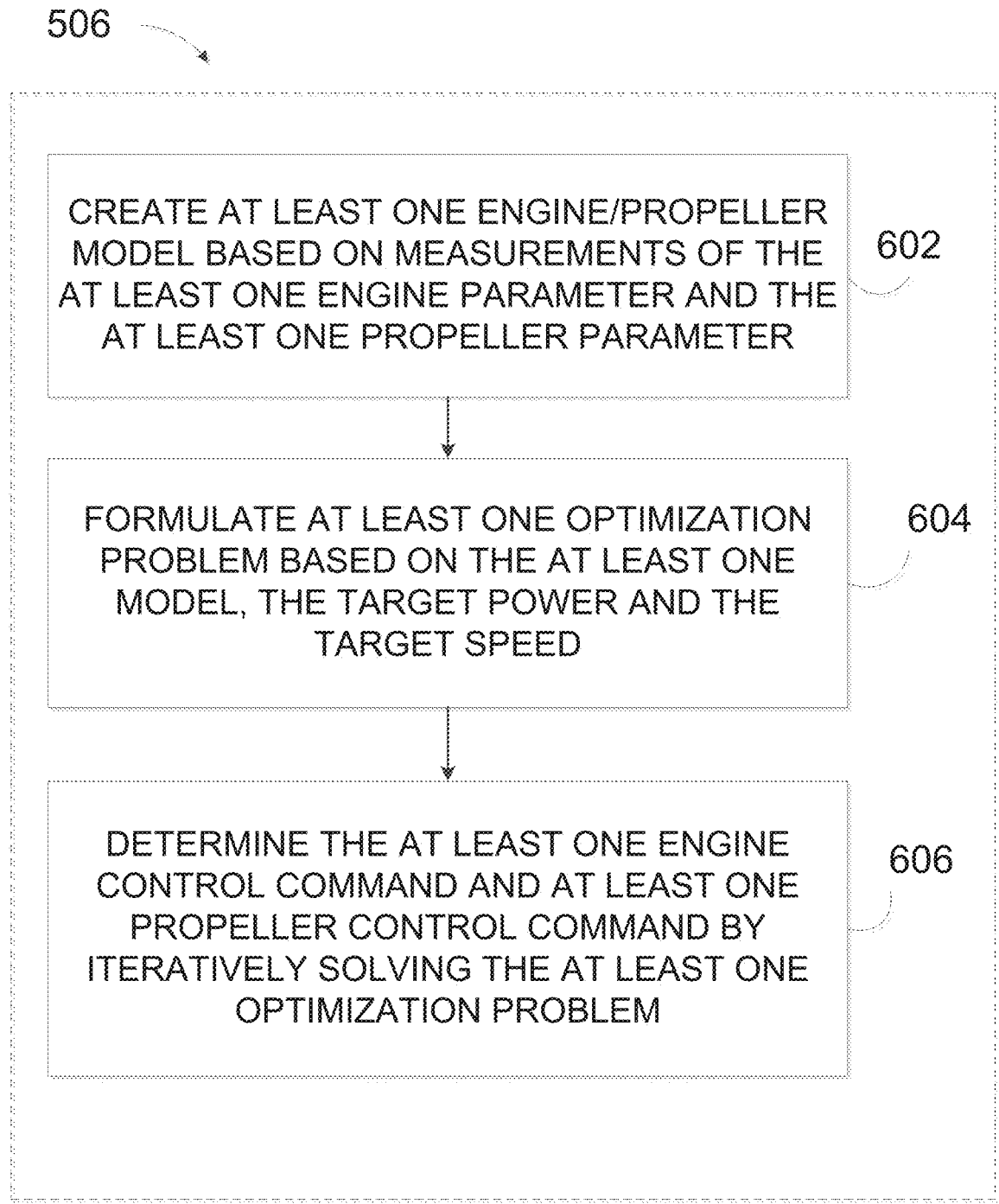
FIG. 6 is a flowchart illustrating an example of the step of FIG. 5 for determining the control commands.

With additional reference to FIG. 6, an example of step 506 is illustrated. At step 602, the engine and the propeller are modelled, thereby creating the at least one model of the engine and the propeller. Step 602 may be performed by the engine and propeller model(s) module 310. The at least one model is created based on the measurements of the at least one engine parameter and the at least one propeller parameter. At step 604, the at least one optimization problem is formulated. Step 604 may be performed by the optimization formulation module 320. The at least one optimization problem is formulated based on the at least one model, the target output power and the target speed. At step 606, the at least one engine control command and the at least one propeller control command are determined by iteratively solving the at least one optimization problem. Step 606 may be performed by the constrained optimization solver module 330.

In some embodiments, the engine parameter used in method 500 is the fuel flow to the engine and the propeller parameter used in method 500 is the beta angle of the propeller 120. Accordingly, in some embodiments, the at least one engine control command comprises a fuel flow command to adjust the fuel flow to the engine 100 and the at least one propeller control command comprises a beta angle command to adjust the beta angle of the propeller 120.

In some embodiments, the engine parameter used in method 500 is the fuel flow to the engine and one or more of an inlet guide vane position, a core guide vane position, engine bleed, and a blow off valve position; and the at least one propeller control command comprises a beta angle command to adjust the beta angle of the propeller 120. Accordingly, the at least one engine control command may comprise control commands for each of the engine parameters and the at least one propeller control command may comprise control commands for each of the propeller parameters.

Figure 7:
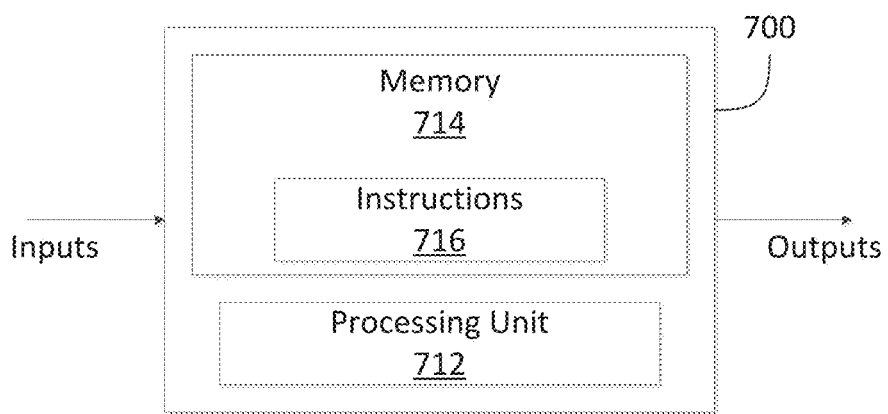
FIG. 7 is a block diagram of an example computing system for implementing the model based controller of FIG. 3A and/or the method of FIG. 5 in accordance with an embodiment.

With reference to FIG. 7, the method 500 may be implemented using a computing device 700 comprising a processing unit 712 and a memory 714 which has stored therein computer-executable instructions 716. Similarly, the model-based controller 210 may be implemented using the computing device 700. The processing unit 712 may comprise any suitable devices configured to implement the system such that instructions 716, when executed by the computing device 700 or other programmable apparatus, may cause the functions/acts/steps of the method 500 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712. In some embodiments, the computing device 700 can be implemented as part of a full-authority digital engine controls (FADEC) or other similar device, including electronic engine control (EEC), engine control unit (ECU), and the like.

The methods and systems for controlling an engine and a propeller described herein may be implemented in a high level procedural or object oriented programming or scripting language, or a combination thereof, to communicate with or assist in the operation of a computer system, for example the computing device 700. Alternatively, the methods and systems for controlling an engine and a propeller may be implemented in assembly or machine language. The language may be a compiled or interpreted language. Program code for implementing the methods and systems for controlling an engine and a propeller may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for controlling an engine and a propeller may also be considered to be implemented by way of a non-transitory computer-readable storage medium having a computer program stored thereon. The computer program may comprise computer-readable instructions which cause a computer, or in some embodiments the processing unit 712 of the computing device 700, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for controlling an engine and a propeller may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A control system for an engine and a propeller coupled to the engine, the control system comprising:
    at least one processing unit;
    a non-transitory computer-readable memory having stored thereon program instructions executable by the at least one processing unit for:
        receiving a target output power for the engine and a target speed for the propeller;
        receiving, from at least one sensing device, a measurement of at least one engine parameter and a measurement of at least one propeller parameter;
        modeling at least one model of the engine based on the measurement of the at least one engine parameter and modeling at least one model of the propeller based on the measurement of the at least one propeller parameter, the at least one model of the engine representative of dynamics of the engine and the at least one model of the propeller representative of dynamics of the propeller;
        generating at least one engine control command based on the target output power, the measurement of the at least one engine parameter, and the at least one model of the engine, the at least one engine control command comprising instructions for adjusting the at least one engine parameter to bring an output power of the engine toward the target output power;
        generating at least one propeller control command based on the target speed, the measurement of the at least one propeller parameter, and the at least one model of the propeller, the at least one propeller control command comprising instructions for adjusting the at least one propeller parameter to bring a rotational speed of the propeller toward the target speed;
        outputting the at least one engine control command for controlling an operation of the engine accordingly; and outputting the at least one propeller control command for controlling an operation of the propeller accordingly.

2. The system of claim 1, wherein the at least one engine parameter comprises a fuel flow to the engine and the at least one engine propeller parameter comprises a beta angle of the propeller.

3. The system of claim 2, wherein the at least one engine control command comprises a fuel flow command to adjust the fuel flow to the engine and the at least one propeller control command comprises a beta angle command to adjust the beta angle of the propeller.

4. The system of claim 2, wherein the at least one engine parameter further comprises at least one of:
an inlet guide vane position, a core guide vane position, and a bleed valve position.

5. The system of claim 1, wherein the program instructions executable by the at least one processing unit for generating the at least one engine control command and the at least one propeller control command comprises:
formulating at least one optimization problem based on the at least one model of the engine, the at least one model of the propeller, the target output power and the target speed; and
determining the at least one engine control command and the at least one propeller control command by iteratively solving the at least one optimization problem.

6. The system of claim 5, wherein the at least one model of the engine and the at least one model of the propeller are determined based on the measurement of the at least one engine parameter, the measurement of the at least one propeller parameter, and at least one of: a calculated engine parameter, a calculated propeller parameter, an ambient condition and an aircraft condition.

7. The system of claim 5, wherein the at least one optimization problem is formulated based on the at least one model of the engine, the at least one model of the propeller, the target output power, the target speed and at least one of: an engine operating limit, a propeller operating limit, an inlet guide vane schedule, a core guide vane schedule and a blow off valve schedule.

8. The system of claim 1, wherein the program instructions are further executable for determining a target torque for the engine from the target output power; and wherein determining the at least one engine control command comprises determining the at least one engine control command based on the target torque, the measurements of the at least one engine parameter and the at least one model of the engine.

9. A method for controlling an engine and a propeller coupled to the engine, the method comprising:
receiving a target output power for the engine and a target speed for the propeller;
receiving, from at least one sensing device, a measurement of at least one engine parameter and a measurement of at least one propeller parameter;
modeling at least one model of the engine based on the measurement of the at least one engine parameter and modeling at least one model of the propeller based on the measurement of the at least one propeller parameter, the at least one model of the engine representative of dynamics of the engine and the at least one model of the propeller representative of dynamics of the propeller;
generating at least one engine control command based on the target output power, the measurement of the at least one engine parameter, and the at least one model of the engine, the at least one engine control command comprising instructions for adjusting the at least one engine parameter to bring an output power of the engine toward the target output power;
generating at least one propeller control command based on the target speed, the measurement of the at least one propeller parameter, and the at least one model of the propeller, the at least one propeller control command comprising instructions for adjusting the at least one propeller parameter to bring a rotational speed of the propeller toward the target speed;
outputting the at least one engine control command for controlling an operation of the engine accordingly; and
outputting the at least one propeller control command for controlling an operation of the propeller accordingly.

10. The method of claim 9, wherein the at least one engine parameter comprises a fuel flow to the engine and the at least one engine propeller parameter comprises a beta angle of the propeller.

11. The method of claim 10, wherein the at least one engine control command comprises a fuel flow command to adjust the fuel flow to the engine and the at least one propeller control command comprises a beta angle command to adjust the beta angle of the propeller.

12. The method of claim 10, wherein the at least one engine parameter further comprises at least one of: an inlet guide vane position, a core guide vane position, and a bleed valve position.

13. The method of claim 9, wherein generating the at least one engine control command and the at least one propeller control command comprises:
formulating at least one optimization problem based on the at least one model of the engine, the at least one model of the propeller, the target output power and the target speed; and
determining the at least one engine control command and the at least one propeller control command by iteratively solving the at least one optimization problem.

14. The method of claim 13, wherein the at least one model of the engine and the at least one model of the propeller are determined based on the measurement of the at least one engine parameter, the measurement of the at least one propeller parameter, and at least one of: a calculated engine parameter, a calculated propeller parameter, an ambient condition and an aircraft condition.

15. The method of claim 13, wherein the at least one optimization problem is formulated based on the at least one model of the engine, the at least one model of the propeller, the target output power, the target speed and at least one of: an engine operating limit, a propeller operating limit, an inlet guide vane schedule, a core guide vane schedule and a blow off valve schedule.

16. The method of claim 9, further comprising determining a target torque for the engine from the target output power; and wherein determining the at least one engine control command comprises determining the at least one engine control command based on the target torque, the measurements of the at least one engine parameter and the at least one model of the engine.

* * * * *